Dec. 16, 1958 A. YORINKS 2,864,656
SLIDE MECHANISM
Filed June 25, 1954 2 Sheets-Sheet 1

*INVENTOR.*
ALEXANDER YORINKS
BY
Leonard H. King
AGENT

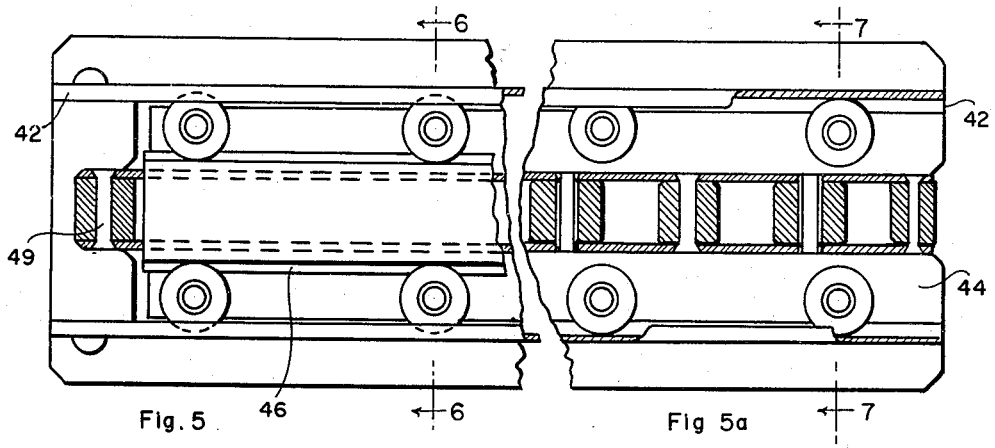
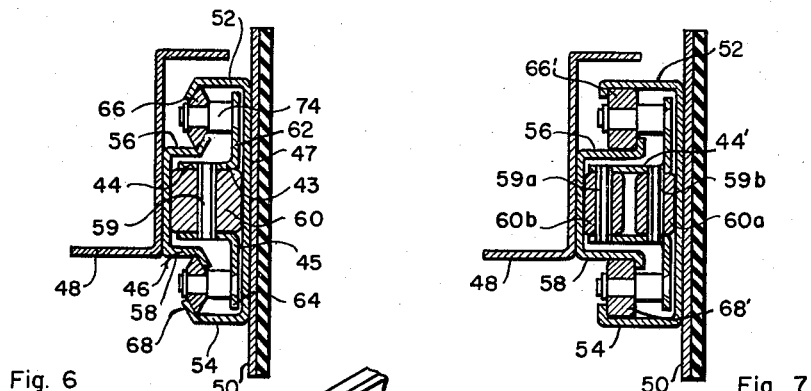
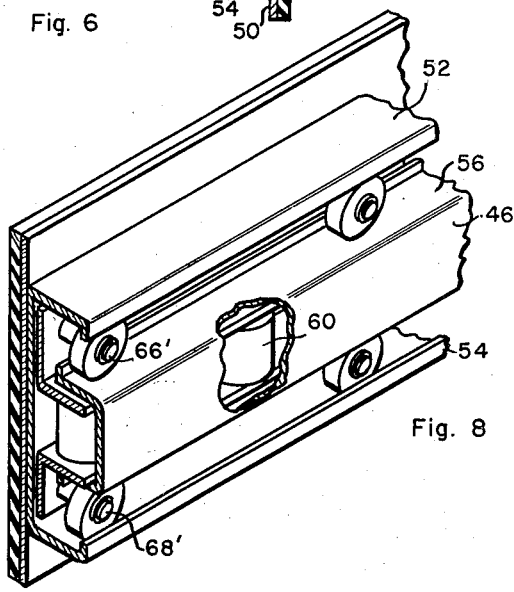

United States Patent Office 2,864,656
Patented Dec. 16, 1958

2,864,656

SLIDE MECHANISM

Alexander Yorinks, New Hyde Park, N. Y.

Application June 25, 1954, Serial No. 439,341

6 Claims. (Cl. 308—3.8)

This invention relates to slides, and more particularly to apparatus for slidably supporting drawers and analogous slidable elements.

In modern industrial equipment, as well as in office equipment, slide devices are performing increasingly important functions. In the electronics field, for instance, slides have found utility not only in conjunction with combination television, radio and phonograph sets, but also in conjunction with movable chassis sections in complex equipment in which slides serve to make internally operating parts readily accessible for repair and maintenance.

Because of their more frequent industrial application, modern slide devices must qualify for supporting heavier loads of more delicate equipment than prior devices. It has, therefore, become necessary to provide sturdy slide devices of superior quality which enable the withdrawing of the slidable element with a minimum of effort and which is not subject to lateral or vertical vibration.

It is accordingly an object of the invention to provide improved slide devices made of easily fabricated parts which are adaptable to mass production.

Another object of the invention is to provide improved precision slides whose operations are characterized by substantially no lateral or vertical displacement of parts.

A further object of the invention is to provide improved slide devices whose parts are readily serviced.

Another object of the invention is to provide improved slide devices which operate with a minimum of wear.

Briefly, the invention in one form thereof is a three-section telescoping slide which includes a fixed track, an intermediate member and a load supporting track. An easily demounted floating member, which includes all of the frictionally engaged bearing parts of the slide assemblage, serves as the intermediate member and engages the fixed track. The floating member also supports an extension member which is affixed to the slidable object. The slide members are anti-frictionally engaged by roller bearings which are vertically and horizontally disposed in order to avoid displacements in any direction. Each of the slide members is of relatively simple construction which is adaptable to mass production.

A feature of the invention is the easily detached floating member which includes all of the frictionally engaged parts of the slide.

Other features of the invention are the vertically and horizontally disposed anti-frictional bearing devices.

Because the invention utilizes a demountable floating member which includes all of the frictionally engaged parts locked into fixed positions, the slides are simple to assemble and easily serviced. The slides are furthermore advantageously suited for mass production. Other advantages of the invention are its provision for heavy-load capacity and low rate of wear. Additionally, the construction of slide devices in accordance with the invention insures a high resistance to shock and vibration.

Other objects and advantages of the invention will become apparent in the following description and as illustrated in the accompanying drawings which disclose the principle of the invention and preferred embodiments thereof. In particular, Figure 2 shows the best mode contemplated for carrying out the invention.

In the drawings:

Fig. 3 is a cross-sectional view of a second embodiment of the invention having the same elevational view as shown in Fig. 1 but altered in the cross-sectional view as taken along lines 3—3 in Fig. 1a.

Fig. 5 is an elevational view of a third embodiment of the invention with hidden sections shown by dotted lines.

Fig. 5a is an elevational view of another embodiment of the invention providing the same appearance in elevation as the embodiment of Fig. 5.

Fig. 6 is a cross-sectional view taken on lines 6—6 of Fig. 5.

Fig. 7 is a cross-sectional view of a fourth embodiment of the invention having the same elevational view as shown in Fig. 5 but altered in the cross-sectional view as taken along lines 7—7 in Fig. 5a.

Fig. 8 is an isometric view of the embodiment of Fig. 7.

Figures 1, 1A:
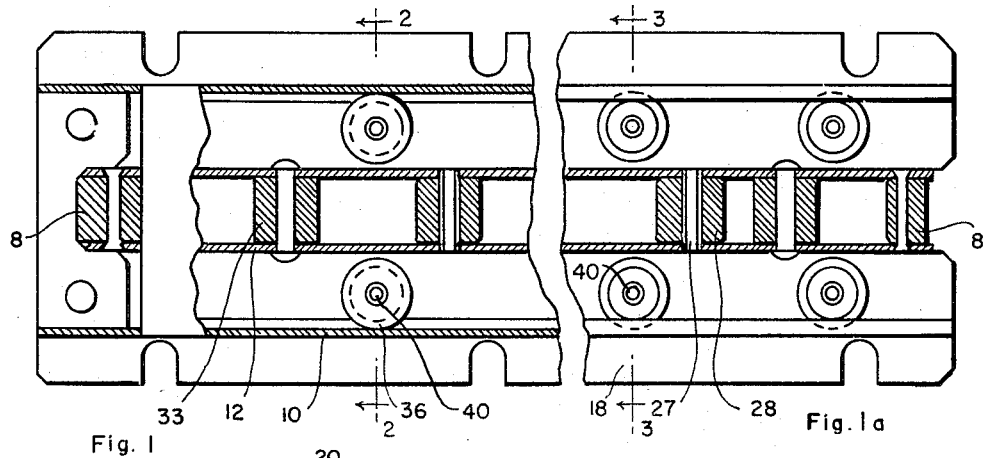
Fig. 1 is an elevational view of one embodiment of the invention with hidden sections shown by dotted lines.
Fig. 1a is an elevational view of another embodiment of the invention with hidden sections shown by dotted lines.

In the description which follows, a load member will be assumed such as, for example, the drawer of a file cabinet, a phonograph of a console television set or a slidable chassis in a piece of industrial electronic equipment.

Each slide apparatus will be intended to permit the load member to be moved out of or into its housing in a direction hereinafter designated the horizontal direction in a horizontal plane. Vertical direction is intended to mean a direction at right angles to the horizontal plane; lateral direction is intended to mean a direction in the horizontal plane but transverse to the horizontal direction of the load member.

While for reasons of clarity, the invention as shown in the drawings is described and claimed in terms of a vertically mounted mechanism, it is to be understood that the mechanism may be horizontally mounted for particular applications.

Each of the embodiments of the invention, as will subsequently be described in detail, are three-piece telescoping slides although certain of the principles involved apply as well to two-piece slides.

The three-piece telescoping slides each include a track member for affixing the slide apparatus to the housing of the load member, an extension member to which the load member may be directly or indirectly attached, and a floating member which is interposed between the track member and the extension member to provide for additional horizontal displacement of the load member. The floating member performs additional specific functions in the invention as will be shown.

Figure 2:
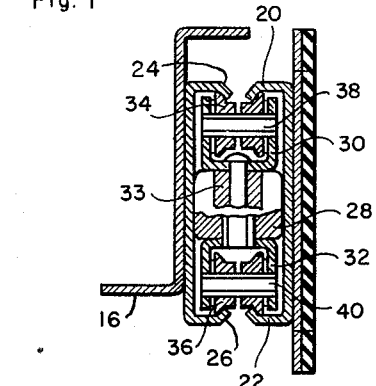
Fig. 2 is a cross-sectional view of the apparatus shown in Fig. 1 taken along lines 2—2.

Referring now to the first embodiment of the invention shown in Figs. 1 and 2, it will be seen that the particular slide apparatus comprises the track member 10, the floating member 12, and the extension member 14. A bracket 16 may be welded or bolted to the extension member 14 to support a load member and the track member 10 is shown attached to a section of the housing 18 and may be either welded or bolted thereto.

The track member 10 includes the upper flanged guide 20 and the lower flanged guide 22 which extend laterally inward from the housing 18. The track member 10 supports the remainder of the slide apparatus.

The extension member 14 comprises the upper and lower flanged guides 24 and 26.

In Figure 1, it is seen that the members 10, 12 and 14 are provided with the usual stops 8 to prevent these members from accidentally disengaging when the load member is fully withdrawn from the housing 18. The stops 8 may be spring loaded (not shown) to facilitate disengaging the members for servicing.

Figure 4:
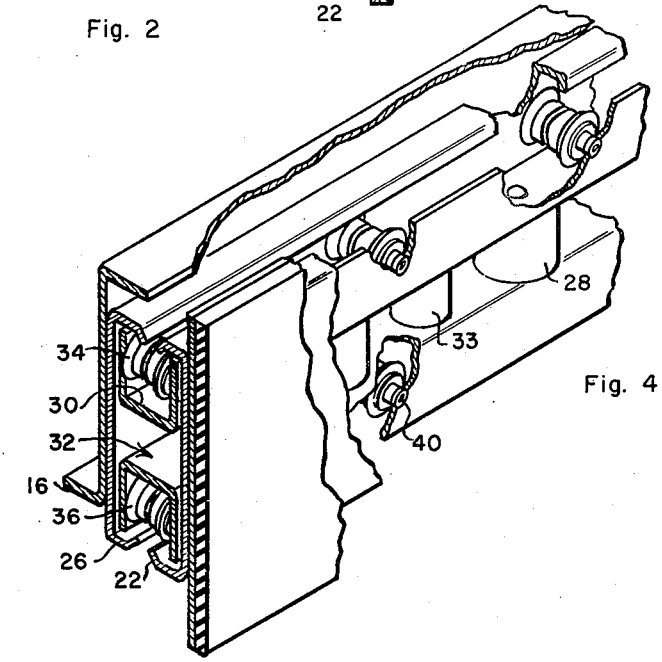
Fig. 4 is an isometric view of the embodiment of Fig. 2.

The operation of the slide apparatus can best be understood with reference to the cross-sectional view in Fig. 2 and the isometric view of Fig. 4 in which the details of the floating member 12 are most clearly presented.

The floating member 12 is an I beam structure whereof the web section is obscured in the view by the pivot pin 27 supporting the roller bearing 28 which passes through a slot provided in the I section. The flanges of the I beam structure are the channel sections 30 and 32. The web may be formed integrally with the channel section and perforated to receive the roller bearings or alternatively two channel sections may be joined by mechanically affixed spacers 33 which form the web section illustrated.

The flanged sections 30 and 32 support the spool-shaped roller bearings 34 and 36 by means of the pivot pins 38 and 40, respectively. The inner faces of the roller bearings 34 and 36 are beveled at an angle so that they flatly and non-frictionally contact the obliquely extending legs of the upper flanged guides 20 and 24 and the lower flanged guides 22 and 26.

The roller bearings 28, 34 and 36 constitute anti-frictional means which are the only means by which the members 10, 12 and 14 are inter-engaged. It should be noted that all of the members 10, 12 and 14 are therefore non-frictionally engaged.

Additionally, it will be noted that the only frictionally engaged components of the slide are the stops 8 and the roller bearings 28, 34 and 36 with their respective pivot pins 27, 38 and 40.

In any slide apparatus, the frictionally engaged components require the most servicing. Thus, since all of the frictionally engaged parts in this embodiment of the invention are included in the demountable floating member 12, servicing is made most convenient. Further, since the members 10, 12 and 14 are non-frictionally engaged, provision has been made for minimizing the effort required for moving the load member.

In operation, the roller bearing 28 spaces the track member 10 from the extension member 14 and, in conjunction with the beveled faces of the roller bearings 34 and 36, insures the substantial absence of lateral shift and vibration. Vertical shift and vibration is likewise minimized due to the use of the roller bearings 34 and 36. Thus, the invention utilizes horizontally and vertically disposed roller bearings to provide a slide apparatus which is substantially resistant to vibration and shock. The roller bearings 28, 34 and 36 can also be obliquely disposed without departing substantially from the spirit of the invention. It should be noted that the roller bearings 34 and 36 are split transversely so as to permit the two halves to rotate in opposite directions.

The operation of the slide consists of the floating member 12 and the extension member 14 moving horizontally forward in respect to the track member 10. The extension member 14 moves past the track member 10 at twice the rate of speed as does the floating member 12. Thus, when the floating member 12 is fully extended on the track member 10, the extension member 14 is fully extended on the floating member 12. The roller bearings 28, 34 and 36 are disengaged as the track member 10 and the extension member 14 are horizontally displaced from each other. In this manner, the described apparatus functions as a three-piece telescoping slide.

Figure 3:
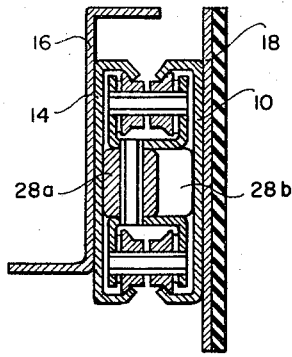

Referring to Fig. 1a and Fig. 3, a modification of the first embodiment of the invention is illustrated. Since the elevational view of this second embodiment shown in Fig. 1a is the same as is shown in Fig. 1 the same description will apply with respect to the elevational view and, reference is now made to the cross-sectional view shown in Fig. 3 in which the single, vertically disposed roller bearing is replaced by the two roller bearings 28a and 28b.

The track member 10 is affixed to the housing 18 and the bracket 16 is affixed to the extension member 14 as previously described. The floating member 12 is modified however to support the two parallel pivot pins 27a and 27b which support the roller bearings 28a and 28b respectively.

The roller bearings 28a and 28b function as did their counterpart in Fig. 2, but since each of the roller bearings 28a and 28b contact only one member 10 or 14, the wear on the roller bearings 28a and 28b is proportionately less. Also, this embodiment realizes all of the advantages inherent in the previously described embodiment.

The embodiment of Fig. 2 is shown isometrically in Fig. 4.

A third form of slide in accordance with the invention is illustrated in Figs. 5 and 6.

In Fig. 5, it is seen that the apparatus comprises the track member 42, the floating member 44 and the extension member 46. A bracket 48 may be welded or bolted to the extension member 46 to support a load member and the track member 42 is shown attached to the housing 50.

The track member 42 comprises the upper and lower flanged guides 52 and 54 which have obliquely extending sections. The extension member 46 is a U-shaped member having the obliquely extending flanges 56 and 58.

Members 42, 44 and 46 are provided with the usual stops 49 to prevent the members 42, 44 and 46 from being accidentally disengaged. The stops 49 are spring loaded to facilitate disengaging the members for servicing.

The operation of the slide apparatus can best be understood with reference to the cross-sectional view in Fig. 6 and the isometric view of Fig. 8 in which the details of the floating member 44 are clearly represented.

The floating member 44 consists of U-shaped portion 43 having extending flanges 45 and 47 normal to the legs of the U and designed to fit within the extension member 46 without frictional contact. The floating member 44 includes the flanged sections 62 and 64 and includes an aperture for containing the roller bearing 60 which is supported on the pivot pin 59.

The floating member 44 also includes the pivot pins 70 and 72 on which the roller bearings 66 and 68 rotate respectively.

The roller bearings 66 and 68 are provided with polygon-shaped cross-sections and vertically space the members 42 and 46 to maintain substantial freedom from vertical displacement of the extension member 46. The diamond-shape shown in Figure 6 is preferred to a rectangular cross-section shown in Figure 7 since a rectangular cross-section presents a side wall which frictionally engages the oblique section in a sliding fashion rather than the preferred rolling condition of the diamond-shape shown.

The cross-sections of the roller bearings 66 and 68 also permit a lateral engagement of the oblique sections 80 and 82 and 84 and 86 of the lower flanged guides 52 and 54 and the flanges 56 and 58 respectively without the necessity of frictional engagement while the slide is in motion.

The roller bearing 60 functions to maintain a close contact between the flanges 56 and 58 and the beveled faces of the roller bearings 66 and 68 and thereby substantially prevents a lateral displacement of the extension member 46.

It will be noted that the roller bearings 60, 66 and 68 are anti-frictional means and are the only means by which the members 42, 44, and 46 are interengaged. Additionally, it should be noted that the only frictionally engaged parts are those required for the rotation of the roller bearings 60, 66 and 68. Thus, since all of the frictionally engaged parts are included in the demountable floating member 44, servicing is again facilitated.

Further, since the members 42, 44 and 46 are non-frictionally engaged, the wear of these parts is minimized. Thus, the slide functions as a three-piece telescoping slide which inherently possesses the advantages previously noted.

Referring now to Figure 7, a fourth embodiment is shown. As the elevational view of the fourth embodiment, shown in Fig. 5a, is the same as shown in Fig. 5, the foregoing description of the embodiment shown in the elevational view of Fig. 5 will likewise apply to Fig. 5a.

In Fig. 7, the track member 42 is attached to the housing 50 and the bracket 48 is affixed to the extension member 46 as previously described. The floating member 44' is however modified to support the two parallel pivot pins 59a and 59b which respectively support the roller bearings 60a and 59b. Either the diamond-shaped bearings 66 and 68 or the rectangular shaped bearings 88 may be employed in this embodiment.

Since each of the roller bearings 60a and 60b contact only one member 42 or 46, the wear on the roller bearings 60a and 60b is less than that of the roller bearing 60 in Fig. 6 although the same function is performed.

The fourth embodiment additionally realizes all of the advantages heretofore recited.

In each of the embodiments of the invention herein illustrated, it is seen from the cross-sectional views that the basic parts are simply shaped. These parts are therefore adaptable to production by extrusion and simple shaping.

Thus, several three-piece telescoping slides have been described in accordance with the invention. It is realized that many of the principles herein adapted are further applicable to the other types of slides, notably two-piece slides.

In summary, the invention provides an improved slide, made of easily fabricated parts which are adaptable to mass production. The invention also provides for the virtual absence of lateral or vertical displacement of sliding member. In addition, the invention provides for slides which are easily maintained and which operate with a minimum of wear.

Although only four embodiments of the invention have been described herein, there will now be obvious to those skilled in the art many modifications and variations which accomplish the foregoing objects and realize many or all of the advantages, but which do not depart essentially from the spirit of the invention.

What is claimed is:

1. A slide apparatus including frictionally and non-frictionally engaged components comprising a track member being disposed in a given plane, a floating member, and an extension member, said floating member including all of said frictionally engaged components, the axes of a plurality of said frictionally engaged components being disposed in said given plane, the axes of a plurality of other of said frictionally engaged components being angularly disposed to said given plane, said floating member being non-frictionally interposed between said track member and said extension member, certain of said frictionally engaged components spacing said track member from said floating member, other of said frictionally engaged components spacing said floating member from said extension member.

2. A slide apparatus including bearings and non-frictionally engaged components comprising a track member being disposed in a given plane, a floating member, and an extension member, said floating member including all of said bearings, the axes of a plurality of said bearings being disposed in said given plane, the axes of a plurality of other of said bearings being angularly disposed to said given plane, said floating member being non-frictionally interposed between said track member and said extension member, certain of said bearings spacing said track member from said floating member, other of said bearings spacing said floating member from said extension member.

3. A slide apparatus including roller bearings and non-frictionally engaged components comprising a track member being disposed in a given plane, a floating member, and an extension member, said floating member including all of said roller bearings, the axes of a plurality of said roller bearings being disposed in said given plane, the axes of a plurality of other of said roller bearings being angularly disposed to said given plane, said floating member being non-frictionally interposed between said track member and said extension member, certain of said roller bearings spacing said track member from said floating member, other of said roller bearings spacing said floating member from said extension member.

4. A slide section including roller bearings comprising a track having upper and lower flanged guides, an extension member having upper and lower flanged guides, said upper and lower flanged guides having obliquely extending sections, and a floating member including all of said roller bearings, said track and said extension member being vertically disposed, certain of said roller bearings having their axes horizontally disposed, a plurality of said roller bearings having their axes vertically disposed, said horizontally disposed roller bearings having faces for non-frictionally engaging said obliquely extending sections of said upper and lower flanged guides, said vertically disposed roller bearing non-frictionally spacing said extension member from said track, said vertically disposed roller bearing also non-frictionally spacing said floating member from said track and said extension member.

5. The slide section of claim 4 wherein said horizontally disposed roller bearings comprise two independent freely rotating roller bearings.

6. A slide section including roller bearings comprising a track having upper and lower flanged guides, an extension member having upper and lower flanged guides, said upper and lower flanged guides having obliquely extending sections, and a floating member comprising an I-shaped structure, said floating member including all of said roller bearings, said track and said extension member being vertically disposed, certain of said roller bearings rotating on horizontal pivot pins, two rows of said roller bearings rotating on vertical pivot pins, said roller bearings mounted on said horizontal pins having obliquely bevelled faces for non-frictionally engaging said obliquely extending sections of said upper and lower flanged guides, said two of said roller bearings non-frictionally spacing said extension member from said track, one of said roller bearings rotating on said vertical pivot pins non-frictionally spacing said floating member from said track, the other of said roller bearings rotating on said vertical pivot pins non-frictionally spacing said extension member from said floating member.

References Cited in the file of this patent

UNITED STATES PATENTS

| 1,189,580 | Kenyon | July 4, 1916 |
| 2,032,054 | Gussack | Feb. 25, 1936 |
| 2,692,802 | Kurtzon et al. | Oct. 26, 1954 |

FOREIGN PATENTS

| 892,553 | France | Apr. 12, 1944 |
| 242,323 | Switzerland | Sept. 16, 1946 |